(12) United States Patent
Rybacki et al.

(10) Patent No.: US 11,003,654 B2
(45) Date of Patent: May 11, 2021

(54) SYSTEMS AND METHODS FOR REQUESTING, TRACKING AND REPORTING MODIFICATIONS TO A RECORD

(71) Applicant: AppExtremes, LLC, Broomfield, CO (US)

(72) Inventors: Doug Rybacki, Seattle, WA (US); Natasha Reid, Westminster, CO (US); Amy J. Reams, Arvada, CO (US)

(73) Assignee: AppExtremes, LLC, Broomfield, CO (US)

( * ) Notice: Subject to any disclaimer, the term of this patent is extended or adjusted under 35 U.S.C. 154(b) by 100 days.

(21) Appl. No.: 16/137,193

(22) Filed: Sep. 20, 2018

(65) Prior Publication Data
US 2019/0087449 A1    Mar. 21, 2019

Related U.S. Application Data

(63) Continuation-in-part of application No. 15/826,026, filed on Nov. 29, 2017.

(60) Provisional application No. 62/560,915, filed on Sep. 20, 2017.

(51) Int. Cl.
| | |
|---|---|
| *G06F 16/23* | (2019.01) |
| *G06F 3/0482* | (2013.01) |
| *G06F 3/0484* | (2013.01) |
| *G06F 16/27* | (2019.01) |
| *G06F 16/28* | (2019.01) |
| *G06F 40/279* | (2020.01) |

(52) U.S. Cl.
CPC ........ *G06F 16/2358* (2019.01); *G06F 3/0482* (2013.01); *G06F 3/0484* (2013.01); *G06F 16/235* (2019.01); *G06F 16/27* (2019.01); *G06F 16/284* (2019.01); *G06F 40/279* (2020.01)

(58) Field of Classification Search
CPC .... G06F 16/2358; G06F 16/27; G06F 16/284; G06F 16/235; G06F 40/279; G06F 3/0462; G06F 3/0484
USPC ........................................................ 715/229
See application file for complete search history.

(56) References Cited

U.S. PATENT DOCUMENTS

| | | | |
|---|---|---|---|
| 6,289,460 B1 | 9/2001 | Hajmiragha | |
| 6,298,342 B1 * | 10/2001 | Graefe | G06F 16/284 707/602 |
| 6,944,648 B2 | 9/2005 | Cochran et al. | |
| 7,278,168 B1 | 10/2007 | Chaudhury et al. | |
| 7,315,947 B2 | 1/2008 | Pravetz et al. | |

(Continued)

OTHER PUBLICATIONS

Zhang et al., Research and Implementation for Data Synchronization of Heterogeneous Databases, IEEE 2010, pp. 1-7. (Year: 2010).*

(Continued)

*Primary Examiner* — William D Titcomb
(74) *Attorney, Agent, or Firm* — FisherBroyles LLP; Ian R. Walsworth

(57) ABSTRACT

Systems and methods for requesting, tracking and reporting modifications to a record are the subject of the present disclosure. In one embodiment, the record is associated with a customer-relationship management or CRM system. According to varying embodiments, the system and method may be implemented through the use of one or more modules and may permit one of several actions to be taken with respect to a record.

20 Claims, 4 Drawing Sheets

(56) References Cited

U.S. PATENT DOCUMENTS

| | | | |
|---|---|---|---|
| 7,353,397 | B1 | 4/2008 | Herbach |
| 7,370,206 | B1 | 5/2008 | Goldman |
| 7,395,503 | B1 | 7/2008 | Pravetz |
| 7,406,599 | B1 | 7/2008 | Pravetz et al. |
| 7,434,048 | B1 | 10/2008 | Shapiro et al. |
| 7,581,106 | B1 | 8/2009 | Das et al. |
| 7,660,981 | B1 | 2/2010 | Hunt |
| 7,694,145 | B1 | 4/2010 | Pravetz et al. |
| 7,698,559 | B1 | 4/2010 | Chaudhury et al. |
| 7,707,642 | B1 | 4/2010 | Herbach et al. |
| 7,735,144 | B2 | 6/2010 | Pravetz et al. |
| 7,770,015 | B1 | 8/2010 | Goldman et al. |
| 7,774,608 | B2 | 8/2010 | Pravetz et al. |
| 7,840,802 | B1 | 11/2010 | Shapiro et al. |
| 7,895,166 | B2 | 2/2011 | Foygel et al. |
| 7,900,132 | B2 | 3/2011 | Matveief et al. |
| 7,949,684 | B2 * | 5/2011 | Brooks ............... H04L 63/1433 707/802 |
| 7,996,367 | B2 | 8/2011 | Foygel et al. |
| 7,996,439 | B2 | 8/2011 | Foygel et al. |
| 8,024,561 | B1 | 9/2011 | Das et al. |
| 8,145,909 | B1 | 3/2012 | Agrawal et al. |
| 8,151,114 | B2 | 4/2012 | Chaudhury et al. |
| 8,166,393 | B1 | 4/2012 | Pravetz |
| 8,185,741 | B1 | 5/2012 | Agrawal et al. |
| 8,239,496 | B2 | 8/2012 | Peterson et al. |
| 8,261,082 | B1 | 9/2012 | Goldman |
| 8,275,993 | B2 | 9/2012 | Pravetz et al. |
| 8,359,473 | B1 | 1/2013 | Sorotokin et al. |
| 8,539,004 | B2 | 9/2013 | Foygel et al. |
| 8,583,705 | B2 | 11/2013 | Foygel et al. |
| 8,620,953 | B2 | 12/2013 | Foygel et al. |
| 8,621,222 | B1 | 12/2013 | Das |
| 8,627,269 | B2 | 1/2014 | Malasky et al. |
| 8,635,442 | B2 | 1/2014 | Agrawal |
| 8,655,961 | B2 | 2/2014 | McCabe et al. |
| 8,683,605 | B1 | 3/2014 | Tenenboym et al. |
| 8,688,997 | B2 | 4/2014 | Das et al. |
| 8,713,322 | B2 | 4/2014 | Pravetz et al. |
| 8,793,193 | B2 | 7/2014 | Sorotokin et al. |
| 8,793,492 | B2 | 7/2014 | Shah et al. |
| 8,806,193 | B2 | 8/2014 | Swaminathan et al. |
| 8,832,047 | B2 | 9/2014 | Herbach et al. |
| 8,838,980 | B2 | 9/2014 | Gonser et al. |
| 8,844,055 | B2 | 9/2014 | Follis et al. |
| 8,868,916 | B2 | 10/2014 | Shapiro |
| 8,874,923 | B2 | 10/2014 | Foygel |
| 8,910,258 | B2 | 12/2014 | Gonser et al. |
| 8,914,639 | B2 | 12/2014 | Hogan |
| 8,949,706 | B2 | 2/2015 | McCabe et al. |
| 8,949,708 | B2 | 2/2015 | Peterson et al. |
| 8,954,731 | B2 | 2/2015 | Tenenboym et al. |
| 9,009,477 | B2 | 4/2015 | Das |
| 9,058,506 | B2 | 6/2015 | Pravetz et al. |
| 9,158,750 | B2 | 10/2015 | Matveief et al. |
| 9,178,707 | B2 | 11/2015 | Foygel |
| 9,219,753 | B2 | 12/2015 | Fleischman et al. |
| 9,229,919 | B1 * | 1/2016 | Krappe ................ G06F 40/197 |
| 9,230,130 | B2 | 1/2016 | Peterson et al. |
| 9,251,131 | B2 | 2/2016 | McCabe et al. |
| 9,253,206 | B1 | 2/2016 | Fleischman |
| 9,268,758 | B2 | 2/2016 | Gonser et al. |
| 9,276,749 | B2 | 3/2016 | Tenenboym et al. |
| 9,292,876 | B1 | 3/2016 | Shimkus |
| 9,323,937 | B2 | 4/2016 | Follis et al. |
| 9,344,424 | B2 | 5/2016 | Tenenboym et al. |
| 9,367,597 | B2 * | 6/2016 | Behuria ................ G06F 40/18 |
| 9,384,178 | B2 | 7/2016 | Nydam et al. |
| 9,411,971 | B2 | 8/2016 | Follis |
| 9,432,368 | B1 | 8/2016 | Saxena et al. |
| 9,514,117 | B2 | 12/2016 | Gonser |
| 9,521,001 | B2 | 12/2016 | Follis et al. |
| 9,544,149 | B2 | 1/2017 | Follis |
| 9,613,016 | B2 | 4/2017 | Pravetz |
| 9,614,681 | B2 | 4/2017 | Follis et al. |
| 9,626,653 | B2 | 4/2017 | Saxena et al. |
| 9,628,462 | B2 | 4/2017 | Gonser et al. |
| 9,634,975 | B2 | 4/2017 | McCabe et al. |
| 9,692,601 | B2 | 6/2017 | Follis |
| 9,703,982 | B2 | 7/2017 | Kumar et al. |
| 9,727,522 | B1 | 8/2017 | Barber |
| 9,736,127 | B2 | 8/2017 | Fleischman et al. |
| 9,742,746 | B2 | 8/2017 | Fleischman et al. |
| 9,768,965 | B2 | 9/2017 | Tenenboym et al. |
| 9,798,709 | B2 | 10/2017 | Malden |
| 9,798,710 | B2 | 10/2017 | McCabe et al. |
| 9,800,556 | B2 | 10/2017 | Steeves et al. |
| 9,818,138 | B2 | 11/2017 | Shimkus |
| 9,824,198 | B2 | 11/2017 | Carroll et al. |
| 9,842,095 | B2 | 12/2017 | Kumar et al. |
| 9,842,201 | B2 | 12/2017 | Follis et al. |
| 9,882,725 | B2 | 1/2018 | Foygel |
| 9,893,895 | B2 | 2/2018 | Peterson et al. |
| 10,067,928 | B1 * | 9/2018 | Krappe ................ G06F 40/186 |
| 10,073,824 | B1 * | 9/2018 | Krappe .................. G06F 40/18 |
| 10,366,156 | B1 * | 7/2019 | Krappe ................ G06F 40/186 |
| 10,482,391 | B1 * | 11/2019 | Lynch ................ G06F 16/9535 |
| 2003/0023622 | A1 * | 1/2003 | Obermeyer ............ G06Q 10/10 715/229 |
| 2004/0225718 | A1 * | 11/2004 | Heinzel ................ G06Q 10/107 709/206 |
| 2005/0015377 | A1 | 1/2005 | Wan |
| 2006/0173876 | A1 * | 8/2006 | Kihneman ............ G06F 16/345 |
| 2007/0185935 | A1 * | 8/2007 | Olivieri ................ G06F 40/18 |
| 2007/0239514 | A1 | 10/2007 | Lissy et al. |
| 2009/0150429 | A1 | 6/2009 | Yamamoto |
| 2009/0182824 | A1 | 7/2009 | Haynes et al. |
| 2011/0238437 | A1 | 9/2011 | Zhou |
| 2013/0050512 | A1 | 2/2013 | Gonser et al. |
| 2013/0254111 | A1 | 9/2013 | Gonser et al. |
| 2014/0032529 | A1 | 1/2014 | Chang |
| 2014/0207731 | A1 * | 7/2014 | Mack ...................... G06F 16/17 707/609 |
| 2014/0304518 | A1 | 10/2014 | Gonser et al. |
| 2014/0350966 | A1 | 11/2014 | Khatana et al. |
| 2015/0067464 | A1 | 3/2015 | McCabe et al. |
| 2015/0143218 | A1 | 5/2015 | Peterson et al. |
| 2015/0180833 | A1 | 6/2015 | Snow |
| 2015/0248484 | A1 | 9/2015 | Yu |
| 2015/0317295 | A1 | 11/2015 | Sherry |
| 2016/0140101 | A1 | 5/2016 | Gosner, Jr. et al. |
| 2016/0182560 | A1 | 6/2016 | Fleischman |
| 2016/0224526 | A1 | 8/2016 | Gazit et al. |
| 2016/0226829 | A1 | 8/2016 | Steeves et al. |
| 2016/0239471 | A1 | 8/2016 | Shimkus |
| 2016/0378629 | A1 | 12/2016 | Gwozdz |
| 2017/0068646 | A1 * | 3/2017 | Beechuk ................ H04L 67/00 |
| 2017/0223022 | A1 | 8/2017 | Peterson et al. |
| 2017/0223093 | A1 | 8/2017 | Peterson et al. |
| 2017/0329984 | A1 * | 11/2017 | Clough ................ G06F 21/6227 |
| 2017/0346851 | A1 * | 11/2017 | Drake ................ H04L 63/0428 |
| 2017/0353314 | A1 | 12/2017 | Steeves et al. |
| 2017/0353445 | A1 | 12/2017 | Steeves et al. |
| 2017/0374048 | A1 | 12/2017 | Fleischman et al. |
| 2018/0032997 | A1 * | 2/2018 | Gordon ................ G06Q 30/0269 |
| 2018/0046655 | A1 * | 2/2018 | Ward ................ G06F 16/2455 |
| 2018/0067976 | A1 * | 3/2018 | Schoppe ................ G06F 16/252 |
| 2018/0096027 | A1 * | 4/2018 | Romero ................ G06F 16/9535 |
| 2019/0034592 | A1 * | 1/2019 | Gupta ................ G16H 40/20 |
| 2019/0197043 | A1 * | 6/2019 | Rajendran ............ G06N 5/025 |
| 2019/0294477 | A1 * | 9/2019 | Koppes ................ G06F 9/5072 |

OTHER PUBLICATIONS

International Search Report and Written Opinion for PCT/US2018/052056. dated Dec. 10, 2018. 6 pages.

* cited by examiner

SYSTEMS AND METHODS FOR REQUESTING, TRACKING AND REPORTING MODIFICATIONS TO A RECORD

CROSS-REFERENCE TO RELATED APPLICATION

This application is a continuation-in-part of U.S. patent application Ser. No. 15/826,026, filed on Nov. 29, 2017. This application also claims priority to and the benefit under 35 U.S.C. § 119(e) to U.S. Provisional Patent Application Ser. No. 62/560,915 filed Sep. 20, 2017. The foregoing applications are incorporated by reference herein in their entireties.

FIELD OF THE INVENTION

The present invention is generally directed toward systems and methods of selecting and modifying a record, by way of example, a record contained in a customer-relationship management (CRM) data repository. More particularly, the present invention relates to a system for requesting, tracking and reporting modifications to a record via automated, semi-automated and/or synchronous processes.

COPYRIGHT NOTICE

A portion of this disclosure, including any applications incorporated by reference herein and their Appendices, is subject to copyright protection. Limited permission is granted to facsimile reproduction of the patent document or patent disclosure as it appears in the U.S. Patent and Trademark Office (USPTO) patent file or records. The copyright owner reserves all other copyright rights whatsoever.

BACKGROUND OF THE INVENTION

Typical CRM systems contain a variety of information displayed in a variety of different manners. However, the information is not easily visualized in a format that is efficient or convenient for a user to navigate, manage and act upon. In addition, the present limitations on these systems make it difficult, if not impossible, for a user to flag a record that requires further action and assign another user with the task of modifying that record, or reporting to one or more users that action has been taken on a record. Further, current CRM systems contain limitations with respect to tracking modifications once made by another user, or multiple users, over time. Thus, CRM systems presently suffer from a number of shortcomings with respect to managing information and/or modifying information contained within a data repository and accessible by multiple users.

It is with respect to the above issues and other problems presently faced by those of skill in the pertinent art that the embodiments presented herein were contemplated.

SUMMARY OF THE INVENTION

It is therefore one aspect of the present disclosure to provide a user with a system and method to: (1) identify one or more records located in a specific repository; (2) request action with respect to one or more records; (3) initiate the action requested with respect to one or more records; (4) track the action or inaction taken with respect to one or more records; (5) report modifications made to one or more records; and, in certain embodiments, (6) synchronize or reconcile the action or inaction taken with respect to the one or more records within the specific data repository or another data repository.

In embodiments, a specific record may be modified several times by several different individual users. In embodiments, action on a record may be requested by multiple users (referred to as "Requester(s)"), and in other embodiments may be assigned or requested of multiple users (referred to as "Requestee(s)").

It is yet another aspect to provide a user with an efficient way to be notified or alerted of and view requests for action on a record and manage any subsequent modification made to a record.

The systems and methods described in detail herein may comprise one or more graphical displays for conveying the status of a request, whether the user is a requester, requestee or merely copied on the request. The systems and methods also comprise graphical displays for notifying or alerting a user of an action or inaction made on one or more records. In other embodiments, graphical displays convey additional information to a user, such as the result of the action, the details of a modification, the synchronization or reconciliation of an action, or other discrete components or steps of the systems and methods described herein.

It is another aspect to provide a system and method to synchronize modifications across various fields in a system, or across one or more data repositories impacted by a modification. In embodiments, synchronization may be configured to occur automatically or semi-automatically. Synchronization may also occur amongst user displays, and records may be automatically or semi-automatically reconciled by way of the systems and methods described herein.

It is another aspect to provide a system and method for automatically messaging one or more users, including requesters and requestees, when an action (or inaction) has been taken on a record or a modification has been made to a record. Messaging may take the form of a notification or an alert, and priorities for messaging/alerts may be preconfigured by one or more users.

In yet a further aspect of the present disclosure, a computer readable storage medium comprising processor executable instructions operable to utilize the system or perform the methods is provided.

The Summary is neither intended nor should it be construed as being representative of the full extent and scope of the present invention. The present invention is set forth in various levels of detail in the Summary as well as in the attached drawings and in the Detailed Description, and no limitation as to the scope of this disclosure is intended by either the inclusion or non-inclusion of elements, components, etc. in the Summary. Additional aspects of the present disclosure will become more readily apparent from the detailed description.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatically" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "machine-readable media" as used herein refers to any tangible storage medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a flexible disk, hard disk, magnetic tape, or any other magnetic medium, magneto-optical medium, a CD-ROM, any other optical medium, a RAM, a PROM, an EPROM, a FLASH-EPROM, a solid state medium like a memory card, any other memory chip or cartridge, or any other medium from which a computer or like machine can read.

When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, machine engine, artificial intelligence, fuzzy logic, or combination of hardware and software that is capable of performing the functionality associated with that element. Also, while the invention is described in terms of exemplary embodiments, it should be appreciated that individual aspects of the invention may be separately claimed.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosure.

In the drawings.

Figure 1:
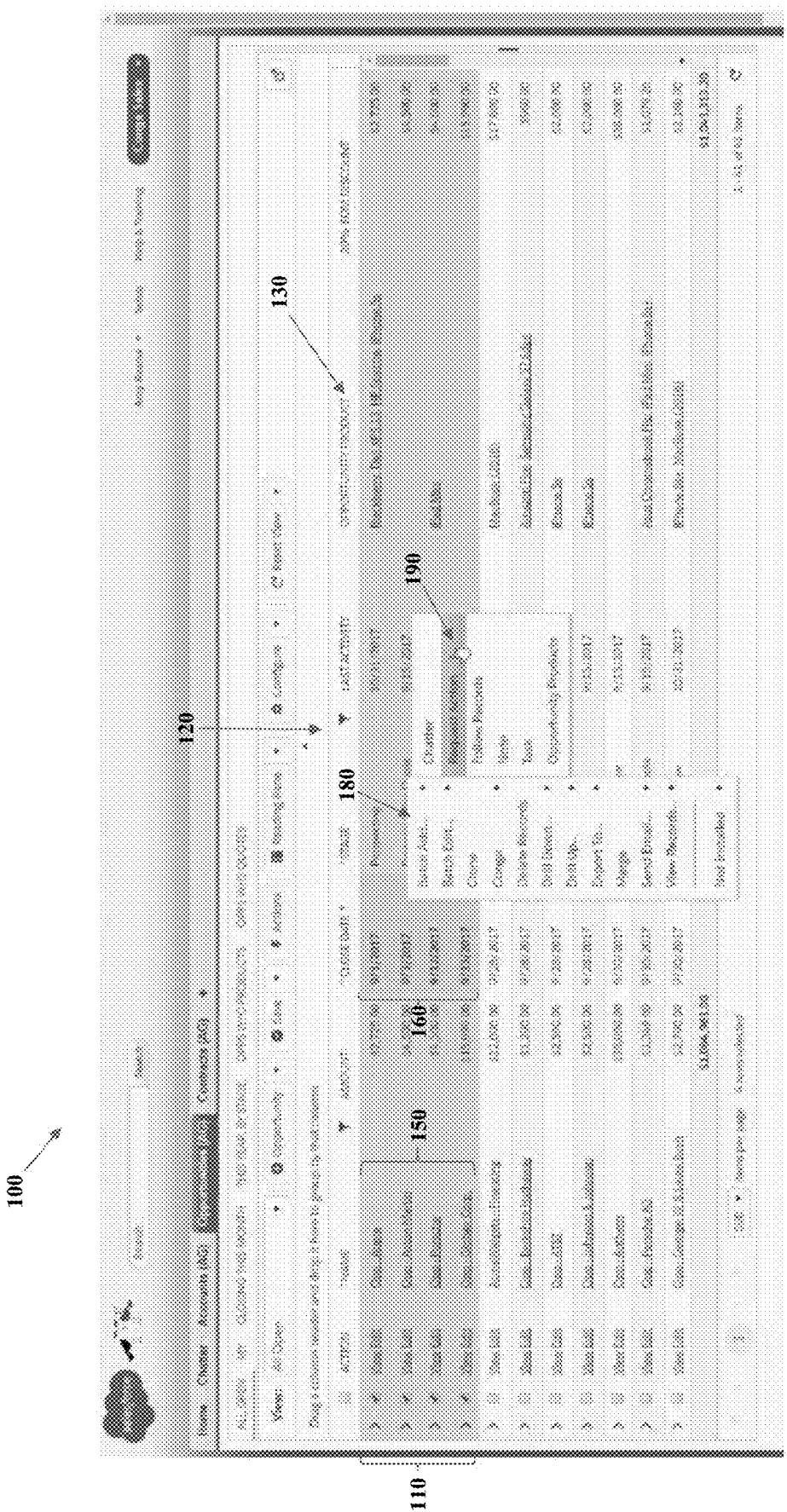
FIG. 1 illustrates a display for reviewing and identifying records in accordance with a preferred embodiment of the present disclosure, including a menu containing the option to request an action taken with respect to one or more records.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

The present disclosure, in varying embodiments, relates to systems and methods for requesting action with respect to one or more records, such as a record contained in a CRM system, and monitoring and reporting action taken in connection with the request and the one or more records. The present disclosure in embodiments includes systems and methods for tracking activity of a user(s) relative to the one or more records subject to a request. The present disclosure also comprises systems and methods for monitoring the status and completion of action(s) taken with respect to one or more records, and reporting modifications made to one or more users. These foregoing systems and methods are preferably associated with records contained in one or more data repositories, including but not limited to CRM data repositories.

According to embodiments described herein, systems and methods of the present disclosure provide the ability of a user to request action be taken on a particular record or records contained in a data repository. For example, a user may flag one or more records and request that a different user (or in certain embodiments, multiple other users) take action on the record(s) and modify the records accordingly. For example, certain information relating to a date may be missing or incomplete for a given record. The user of the system may first identify the missing or incomplete fields and the associated records, and then assign a user or multiple users to complete the missing or incomplete fields. The systems and methods further comprise notifications and alerts to the requesting user and other users, and further comprise automatic or semi-automatic reconciliation and/or synchronization, as described in detail herein.

It is to be expressly understood that this detailed description provides embodiments only, and is not intended to limit the scope, applicability, or configuration of the claimed invention. Rather, the ensuing description will provide those skilled in the art with an enabling description for implementing the embodiments. It should be understood that various changes may be made in the function and arrangement of elements without departing from the spirit and scope of the appended claims. Furthermore, while embodiments of the present disclosure will be described in connection with various examples of records, including documents, it should be appreciated that embodiments of the present disclosure are not so limited. In particular, embodiments of the present disclosure may be applied to any record associated with any data source. For instance, while embodiments of the present invention may be described with respect to Salesforce or an equivalent CRM system, other applicability is contemplated. More particularly, the aspects of the invention described herein may apply to other records, including business, sales, product, inventory, shipping, billing, delivery, processing, manufacturing, supply, and other records, regardless of the repository where the records are stored. It should be understood that the embodiments described herein relative to a CRM data repository is for illustrative purposes only, and should not be construed as limiting the present disclosure.

In varying embodiments, the system and method may be implemented in connection with a data repository or database. By way of example, the data repository may be a CRM system, such as Salesforce, and comprise a variety of different records and record types. In exemplary data repositories, different records and record types are routinely queried, searched, sorted, filtered, accessed, viewed, manipulated, modified, updated, added, deleted, recreated, revised, synchronized, reconciled and/or verified by multiple users during the course of a business day, week, month, etc. In addition, one or more software modules may be employed by a user to search, access, view, manipulate, modify, update, sort, filter, organize, prioritize, reconcile and navigate through the various different records and record types.

The data repository or database may reside in a variety of locations, including on a storage medium local to or resident in one or more of computers. In one embodiment, the data repository or database may reside in a storage-area network ("SAN"), although any necessary files may be stored locally on one or more computers. The data repository or database may be a relational database adapted to store, update, and retrieve data in response to SQL-formatted commands. The database can be any storage mechanism, whether hardware and/or software, for storing and retrieving data, including by example but not limitation, a Hadoop architecture. In embodiments, a database server is provided to communicate with the database and to manage the data within the database. In one embodiment, the database is a relational database and the database server is a SQL server.

One or more web servers are preferably provided to facilitate communication with user devices. The web server preferably receives data or requests for data and communicates with the database server to store or retrieve the data. In embodiments, the web server functions as an intermediary to put the data in the database into a usable form for viewing and manipulation via the user devices. There may be one or several web servers, depending on the system.

Referring now to FIGS. 1-4, and according to embodiments described herein, a software module (occasionally referred to herein as Conga Grid) may be employed in connection with the systems and methods described in this application. In embodiments, the Conga Grid module is preferably used in conjunction with a CRM or other data repository, and permits a user to more efficiently manage, visualize and navigate data, which in many data repositories is displayed in a "list" view (and therefore difficult to organize, sort and manage). The Conga Grid module may also be configured for use with data repositories that display data in a format other than a "list" view.

The Conga Grid module further allows a user to add fields or edit existing fields for certain records directly and without opening additional windows or forms in a separate application. The editing capabilities of Conga Grid further comprise advanced filtering, such that records requiring action (or that have been neglected due to inaction) may be easily viewed and flagged by one or more users.

Referring now to FIG. 1, a display 100 is shown with multiple rows 110, columns 120 and column headings 130. In this view, various fields and records may be displayed in a grid format, which permits a user to quickly search, sort, filter and locate a particular record or a particular field within a particular record. Accordingly, one benefit of the systems and methods described herein is to provide a user with the ability to visualize one or more records and identify where information (i.e., fields) included in a record is missing or incomplete. According to this embodiment, the records stored in the repository may be viewed in a database or spreadsheet format such that various information (i.e., fields) associated with the records are visible to, and in many embodiments readily identifiable by a user. This format permits a user to quickly recognize information that is missing or incomplete for a given record and take appropriate action.

Still referring to FIG. 1, the user is preferably provided with the ability to select a record 150, or a field 160 within a record 150, and prompt a menu 180 of options for further processing of information associated with the field 160/record 150. In certain embodiments, this menu 180 may be in a pick list format. In other embodiments, this may appear as a dialog box or other display. Regardless of the embodiment, the user is provided with the option to request an action 190 be taken with respect to any one or multiple records. The user may select more than one record 150 and/or field 160, if desired, and request multiple actions with respect to the same, as shown in FIG. 1. If the user selects the Request Action 190 item from the menu 180, that step may prompt the user to supply more information, which is described below in connection with FIG. 2.

In embodiments, a user who identifies the missing or incomplete record may provide the missing information directly. For example, a user may provide case comments, update opportunities or influence active or pending deadlines associated with a particular Salesforce record. Dialog boxes or other prompts may solicit this information directly from the user. A user may also update the status of a record or open and close records and/or sub-records associated with one or more records by providing input directly into those fields. In certain embodiments, more than one user may be associated with a request (i.e., multiple Requesters). In certain embodiments, more than one user may be requested to take action on a record (i.e., multiple Requestees).

As information is supplied, the data associated with the underlying data repository is automatically or semi-automatically, and in some embodiments instantaneously updated to reflect the modification. However, this manual updating of records is often difficult for a user because the information necessary to update or modify the record is in the possession of one or more other users. With that issue in mind, reference is now made to FIG. 2.

Figure 2:
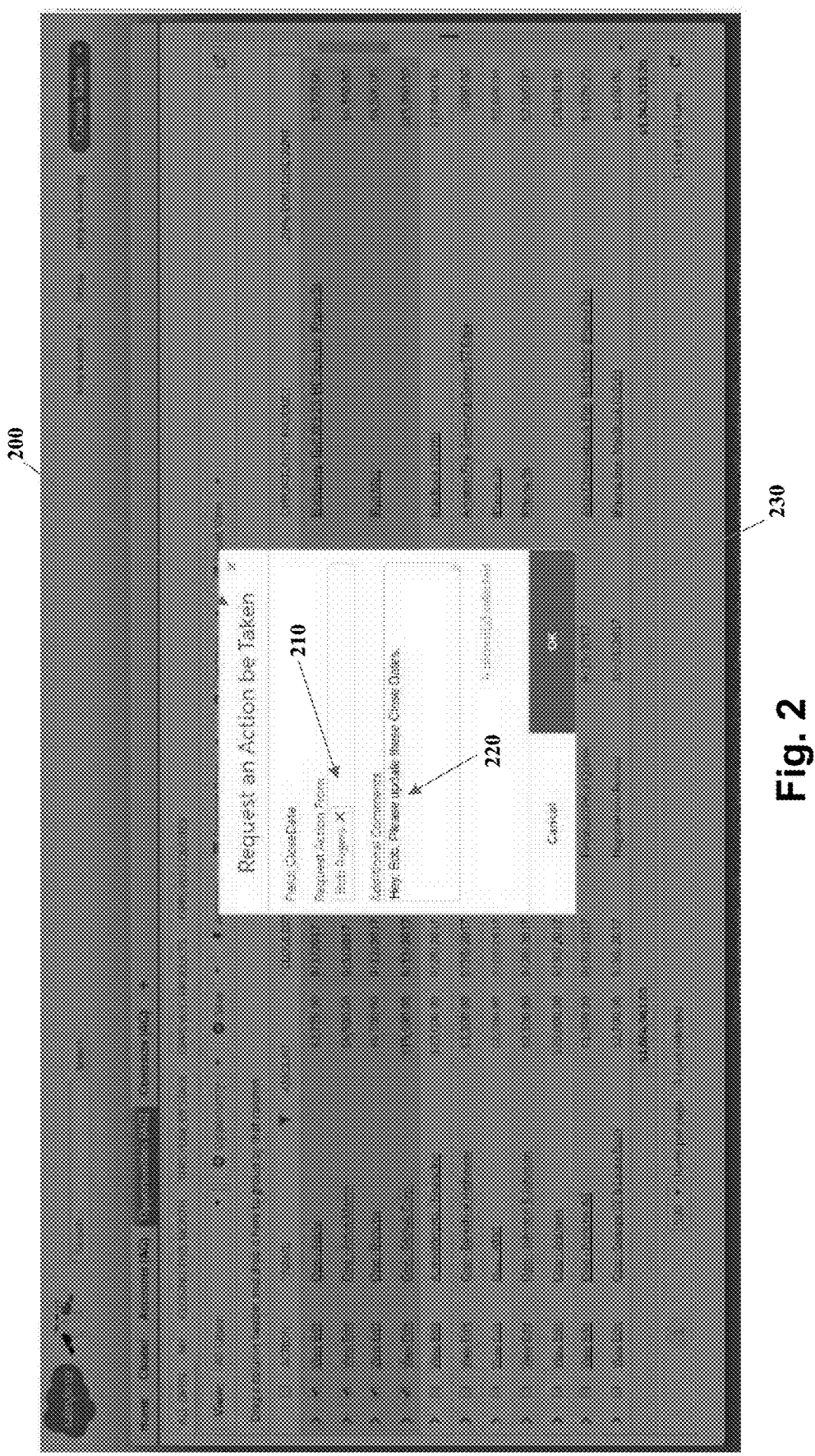
FIG. 2 illustrates a display for identifying the Requestee(s) and providing instructions associated with the request for action in the embodiment of FIG. 1.

Referring specifically to FIG. 2, a display 200 is shown where the system prompts the Requester to identify the Requestee(s) 210 and provide specific instructions for modifying a record or records associated with the request for action. Here, the prompt is in the form of a dialog box, where the user is free to insert written instructions 220 to the identified Requestee(s) 210. In other embodiments, the instructions 220 may be selected from a pick list or prepopulated menu. In other embodiments, the instructions 220 may be automatically generated based on the nature of the missing information in the associated record(s).

As shown in FIG. 2, multiple records are identified as requiring action from a single Requestee 210, although multiple Requestees 210 may be selected. Once the information and instructions are provided by the Requestee 210, the Requester is preferably given an option to send the request 230. As shown in FIG. 2, this may appear as a button or other submission icon for the user to complete the request and send any related messaging.

The system is preferably unconstrained with respect to associating a request with one or several users, and in certain embodiments further comprises the ability to assign unique requests to specific users, each having a specific assignment to complete in order for the record to be successfully modified and thereby completed. Variations on this embodiment and the number of requests, Requesters and Requestees is contemplated with the systems and methods described herein.

In one embodiment, the system may comprise one or more indicia to indicate that a field is missing or incomplete. For example, a cell in the grid or database formatted display may be highlighted or displayed in a different color than the remaining cells, such as in FIGS. 1 and 3-4. As another example, the information contained in the cell, or in an associated row or column of the cell, may be shown with a visual icon. These indicia assist the user in quickly identifying the record(s) that require further action, or that are otherwise incomplete.

Figure 3:
FIG. 3 illustrates a display for presenting the status of a previously initiated request for action from the viewpoint of the Requester.
Figure 4:
FIG. 4 illustrates a display for presenting the status of a request for action from the viewpoint of the Requestee.

Referring now to FIGS. 3-4, multiple graphical displays are shown with the views of the records on which action has been requested from both the Requester and the Requestee's perspective. In FIG. 3, the Requester display now includes an icon 310 next to each of the records where that particular user requested an action be taken. Here, the icon 310 is in the form of a clock, although other icons 310 may be displayed and are described in greater detail herein. In FIG. 4, the Requestee display includes a different set of icons 310 associated with the records that have been specifically requested of that user to modify.

In FIGS. 3-4, the records that are subject to pending requests are also highlighted or painted in a different color than the non-requested records, which can assist the user in identifying the particular records requiring modification or other action. According to another embodiment, the grid or database display may be automatically or manually configured to push all the missing or incomplete records to the forefront of a user's display. For example, those records that contain missing data (i.e., empty fields) may be automatically pushed to the top of the grid or database. Records that have some information but are incomplete may be pushed to the top but following the list of records that have empty fields. In other embodiments, the user may sort and filter one or more rows or columns of the grid display manually in order to identify those fields that are empty or incomplete. In the embodiment where the records are contained in a Salesforce data repository, the actions of sorting and filtering may be achieved through conditional formatting, and may be accomplished by sorting or filtering more than one field, column or row simultaneously.

According to embodiments, a system is provided for generating messaging between users for notifying either a request for action or a subsequent action taken in connection with a record. This messaging may be manually initiated, but in a preferred embodiment occurs automatically once an action is requested or taken directly by a user. For example, messaging may be initiated at the point where a user has identified a missing or incomplete record and assigned an action to another user. The messaging may be generated to appear in a variety of different formats, including direct messaging, text messaging, electronic mail messaging or equivalent messaging formats. The messaging described herein may be achieved through a messaging framework comprising logic and/or instructions for sending notifications, alerts, instructions, etc. from one user of the system to at least one other user.

In the embodiment where Salesforce is the data repository associated with the system, the messaging may be achieved through Salesforce chatter. According to this embodiment, the messaging may be configured to automatically send a message from a Requester to a Requestee. The Requestee may list one or multiple Requesters, and may identify one or multiple Requestees to receive the request, in which case the messaging would be received by each of the identified users. In embodiments, the messaging function, once initiated, remains active during the pendency of the assigned actions and is bi-directional (i.e., messaging may occur from the Requestee to the Requester as actions are completed).

According to embodiments described herein, once any action is taken on the request (partial action or complete action), messaging may also be generated to inform the associated users of the modification to the record(s) impacted by the request. For example, if Requestee is assigned the action of updating a date field associated with a particular record, and after viewing that request updates the record to include the relevant date, a message may be automatically generated to the Requester(s) from the Requestee to indicate that action has been taken. If the Requestee does not have all the information needed to take a complete action, in certain embodiments the Requestee may generate a new request and assign that action to a different user (i.e., a new Requestee). Other users may be included on the messaging at the election of the Requester or the Requestee, including any new Requestee tied to the action. In the embodiment where Salesforce and/or the Conga Grid module are employed, the system may comprise a field listener function to automatically generate messaging post-action. In this embodiment, the field listener is preferably configured to listen for activity with respect to the field, and once a modification is made to that field automatically generate the messaging described herein. In this embodiment, the messaging is sent through Salesforce chatter messaging.

According to embodiments, the system further comprises the ability to graphically display the status of a request for action, including actions initiated (i.e., outbound requests) by a Requester and actions received (i.e., inbound requests) by a Requestee, so that actions assigned by or to a user may be more easily reviewed and the status of those actions may be more efficiently managed. For example, the indicia or icon 310 described above may be applied to any of the fields or records associated with the data repository. A specific icon 310 may be associated with a field, row or column of a particular record that indicates a request has been made by the user with respect to the record, or alternatively that a request has been received by the user with respect to the user, or both. The icons 310 may further be contained in a separate field of the grid or database display and therefore more easily flagged, sorted or filtered relative to the other fields in the grid or database display.

The icon 310 may be configured to be removed once a certain action has been taken, or alternatively may change to a different icon 310 if the requested action is not made within a certain prescribed period of time, or if the assigned action increases or decreases in urgency. For example, the icon 310 assigned to an inbound request may appear in a certain color, and after the passage of time be automatically updated to appear in a different color to reflect that the action has been pending but not acted on for that period of time. In certain embodiments, the Requester may assign the period of time. In other embodiments, the system assigns a default period of time based on the nature of the action requested. Variations on these concepts are contemplated for purposes of the present disclosure.

According to embodiments, the system may further comprise the ability to hover over an icon 310 to view information associated with (1) the Requester, (2) the request, (3) the importance or urgency of the request, (4) the time limit or deadline associated with the request, or (5) the record or records impacted by the request. In this manner, a user may easily view information associated with a requested action to determine the information requested and the urgency of the request for any received requests in the user display. This information may appear, for example, when a user hovers a pointer (or equivalent) over the field where an icon 310 appears indicating a request, or alternatively over the field that has missing or incomplete information.

The application is also preferable configured to provide notifications or alerts. Alerts may be provided via the module (e.g., notification upon login, push notification), email, messaging, or any other suitable method of communication to the user. Alerts may be defined for certain conditions, for example, modification occurring to one or more particular records or fields. Alternately, alerts may be provided for continued modification or approval of an updated record by another user. In some examples, an alert may indicate a recommended course of action. For example, the alert may recommend that additional action be taken, or that a different Requestee be included in order to update the record.

According to embodiments, the functionality described herein may be achieved by way of conditional formatting, which allows a module to display data in a Salesforce repository in an actionable, grid or database fashion. Additional functionality, such as the ability to dynamically filter and sort the information contained in rows or columns of the grid or database, further enhance the system and a user's ability to quickly identify fields with missing or incomplete information.

Methods for using the system and modifying a record are also provided. In varying embodiments, the methods may comprise one or more of the following steps: (1) identifying one or more records located in a specific repository; (2) requesting action with respect to one or more records; (3) initiating the action requested with respect to one or more records; (4) tracking the action or inaction taken with respect to one or more records; (5) reporting modifications made to one or more records; and, in certain embodiments, (6) synchronizing or reconciling the action or inaction taken with respect to the one or more records within the specific data repository or another data repository.

In one embodiment, the user initiates a method with the step of accessing a record. Next, the user selects the record and initiates a request for action on that record. This step may entail identifying and selecting one or more Requestees, identifying and selecting additional Requesters, and providing instructions or comments to the users responsible for modifying the record(s). Next, the Requester completes the request for action and submits the request to the selected Requestees.

In embodiments, the step of initiating a request for action also initiates a method for messaging the users involved in the modification of the record. For example, the request for action may automatically initiate messaging to one or more users associated with the request, and once action is taken may generate additional messaging. This method may occur simultaneously or in near real-time to the actions being taken by the Requester and Requestee. In embodiments, the messaging may be tied to the step of supplying a listening agent, which is configured to generate a message when a field the listening agent if directed towards experiences a change in status. The listening agent may also be configured to generate additional messages when complete action has been taken and/or the requested action is closed.

In one embodiment, the method also comprises a step of modifying the display of records to reflect that a request for action has been taken. This step may occur for both the Requester and the Requestee. In other embodiments, the display may also change as the progress or lack of progress is made with respect to the requested action. Examples of this method are described in greater detail above.

The methods described above may continuously flow in a loop, flow according to a timed event or sequence, or flow according to a change in status. The method may be initiated or suspended by a user, such as a Requester, at various times during the method described above. Changes in status or actions taken by the Requester or Requestee may result in a step of changing the indicia associated with the record(s), and may further results in the step of generating an updated message to the users involved in the request for action.

In varying embodiments described herein, reference has been made to Conga Grid as an add-on software module for use with Salesforce. However, it should be understood that other modules, whether or not associated with the functionality or advantages of Conga Grid, may still operate with the systems and methods described herein and otherwise enjoy the benefits of the present disclosure.

The systems and methods described in detail herein may comprise one or more graphical displays, in addition to those shown in FIGS. 1-4, for conveying the status of a request, whether the user is a requester, requestee or merely copied on the request. The various graphical displays included with the applications incorporated herein are expressly included and form part of this disclosure. The systems and methods may comprise graphical displays for notifying or alerting a user of an action or inaction made on one or more records. In other embodiments, graphical displays convey additional information to a user, such as the result of the action, the details of a modification, the synchronization or reconciliation of an action, or other discrete components or steps of the systems and methods described herein. In yet other embodiments, the graphical displays provide information regarding requests made by a user or missing information from one or more records so that a user may efficiently manage modifications and requested modifications to records. In certain embodiments, a specific record may be modified several times by several different individual users and that activity displayed historically, graphically or otherwise to a user. In embodiments, action on a record may be requested by multiple users, and that activity likewise displayed to a user via the graphical interface.

In embodiments, the systems and methods described above may further comprise an application or be provided via one or several modules. In one embodiment, the application/modules are designed to operate on a mobile device or mobile computer, and assist a user with managing requests for action and any subsequent action taken in connection with one or more records. In one embodiment, the application/modules may comprise one or more data sets, tables or databases, including one or more relational databases. In one embodiment, the application includes time and/or record-specific alerts and/or notifications. In embodiments, the application/modules further permit a user to sort, search and modify records and thereby add or revise data associated therewith. In embodiments, one or more of these advantages of the system are automated, or performed at least semi-automatically.

In embodiments, the application is advantageously configured to receive and send information by, for example, a user's mobile device. In one embodiment, the application comprises one or more user interfaces and displays, such as the displays depicted in the applications incorporated herein by reference. The application and associated user interfaces may be stored or operated on a computing environment, wherein the systems, devices, servers, modules, etc. may execute. The computing environment preferably includes one or more user computers. The computers may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers may also have any of a variety of applications, including for example, database client and/or server applications, and web browser applications. Alternatively, the user computers may be any other electronic device, such as a thin-client computer, Internet-enabled mobile telephone, and/or personal digital assistant, capable of communicating via a network and/or displaying and navigating web pages or other types of electronic documents. Any number of user computers may be supported.

The computing environment described according to this embodiment preferably includes at least one network. The network can be any type of network familiar to those skilled in the art that can support data communications using any of a variety of commercially-available protocols, including without limitation SIP, TCP/IP, SNA, IPX, AppleTalk, and the like. Merely by way of example, the network maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system in varying embodiments may also include one or more server computers. One server may be a web server, which may be used to process requests for web pages or other electronic documents from user computers. The web server can be running an operating system including any of those discussed above, as well as any commercially-available server operating systems. The web server can also run a variety of server applications, including SIP servers, HTTP servers, FTP servers, CGI servers, database servers, Java servers, and the like. In some instances, the web server may publish operations available operations as one or more web services.

According to certain embodiments, the computing environment may also include one or more file and or/application servers, which can, in addition to an operating system, include one or more applications accessible by a client running on one or more of the user computers. The server(s) may be one or more general purpose computers capable of executing programs or scripts in response to the user computers. As one example, the server may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) may also include database servers, including without limitation those commercially available from Oracle, Microsoft, Sybase™, IBM™ and the like, which can process requests from database clients running on a user computer.

In embodiments, the web pages or equivalent graphical displays created by the application server may be forwarded to a user computer or user mobile device via a web server. Similarly, the web server may be able to receive web page requests, web services invocations, and/or input data from a user computer and can forward the web page requests and/or input data to the web application server. In further embodiments, the server may function as a file server. Although the foregoing generally describes a separate web server and file/application server, those skilled in the art will recognize that the functions described with respect to servers may be performed by a single server and/or a plurality of specialized servers, depending on implementation-specific needs and parameters. The computer systems, file server and/or application server may function as an active host and/or a standby host.

In embodiments, the computing environment may also include a database. The database may reside in a variety of locations. By way of example, database may reside on a storage medium local to (and/or resident in) one or more of the computers. Alternatively, it may be remote from any or all of the computers, and in communication (e.g., via the network) with one or more of these. In a particular embodiment, the database may reside in a storage-area network ("SAN") familiar to those skilled in the art. Similarly, any necessary files for performing the functions attributed to the computers may be stored locally on the respective computer and/or remotely, as appropriate. In one set of embodiments, the database may be a relational database, which is adapted to store, update, and retrieve data in response to SQL-formatted commands.

The computer system may also comprise software elements, including but not limited to application code, within a working memory, including an operating system and/or other code. It should be appreciated that alternate embodiments of a computer system may have numerous variations from that described above. For example, customized hardware might also be used and/or particular elements might be implemented in hardware, software (including portable software, such as applets), or both. Further, connection to other computing devices such as network input/output devices may be employed.

According to one embodiment, the server may include one or more components that may represent separate computer systems or electrical components or may software executed on a computer system. These components include a load balancer, one or more web servers, a database server, and/or a database. The load balancer is operable to receive a communication from the mobile device and can determine to which web server to send the communication. Thus, the load balancer can manage, based on the usage metrics of the web servers, which web server will receive incoming communications. Once a communication session is assigned to a web server, the load balancer may not receive further communications. However, the load balancer may be able to redistribute load amongst the web servers if one or more web servers become overloaded.

In embodiments, one or more web servers are operable to provide web services to the user devices. In embodiments, the web server receives data or requests for data and communicates with the database server to store or retrieve the data. As such, the web server functions as the intermediary to put the data in the database into a usable form for the user devices. There may be more or fewer web servers, as desired by the operator.

In this embodiment, a database server is any hardware and/or software operable to communicate with the database and to manage the data within the database. Database servers, for example, SQL server, are well known in the art. The database can be any storage mechanism, whether hardware and/or software, for storing and retrieving data.

In the foregoing description, for the purposes of illustration, systems and methods were described in a particular order. It should be appreciated that in alternate embodiments, the methods may be performed in a different order than that described. It should also be appreciated that the methods described above may be performed by hardware components or may be embodied in sequences of executable instructions on machine-readable media, and which cause a machine, such as a general-purpose or special-purpose processor or logic circuits programmed with the instructions to perform the methods. These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that certain embodiments have been described as a process, which in materials incorporated herein may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the incorporated flowcharts and diagrams. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A system to manage modifications to records, comprising:
computational machinery configured to execute logic instructions via at least one processor;
a data repository comprising a plurality of records;
a record retrieval module, comprising:
a record query tool comprising logic to search for one or more records;
a field selection tool configured to receive input from a user to flag at least one field in the one or more records;
a field annotation tool comprising logic to associate user supplied information with the flagged record;
an action tool comprising logic to prompt a user for information relating to a requested action with respect to the one or more records;
a requested record display module configured to:
identify and assign the requested action to at least one other user;
input instructions to the at least one other user for modifying a record associated with the requested action;
display at least one field or object in the associated record that is incomplete or missing data; and
indicate a status of the record and requested action by associating the same with at least one indicia;
wherein the system prompts a user to identify the at least one other user; and
wherein the system further prompts the at least one other user to input specific information or complete specific instructions for modifying at least one record of the one or more records.

2. The system of claim 1, wherein the data repository comprises at least one relational database.

3. The system of claim 1, wherein the data repository is comprised of at least one customer relationship management database.

4. The system of claim 1, wherein the field annotation tool is comprised of a dialog box.

5. The system of claim 1 further comprising a messaging framework for delivering specific instructions and the requested action to one or more users of the system.

6. The system of claim 5 further comprising logic to alert a user upon completion of the requested action.

7. The system of claim 5 further comprising logic to notify a user if the requested action has not been completed by a predetermined time.

8. The system of claim 1 further comprising a display module configured to:
present one or more data elements representing the requested action of a user; and
receive an input data message from a user and transmit via a messaging framework, wherein the messaging framework comprises logic to deliver additional instructions to at least one user.

9. The system of claim 8, wherein a user is prompted by the display module to select the identities of the at least one user to receive the additional instructions.

10. The system of claim 1 further comprising logic to send periodic notifications to the at least one other user.

11. The system of claim 1, wherein the system automatically synchronizes modifications made to the at least one record with any associated data in the one or more records.

12. The system of claim 1, wherein the system automatically reconciles modifications made to the at least one record with the one or more records.

13. A method for requesting and managing modifications to at least one record maintained in a relational database, comprising the steps of:
   identifying one or more records located in the relational database;
   requesting, by a user of the relational database, an action of at least one user of the relational database with respect to one or more records;
   assigning the requested action to the at least one user;
   initiating the action requested with respect to the one or more records;
   tracking the action or inaction taken by the at least one user with respect to the one or more records;
   reporting modifications made by the at least one user to the one or more records;
   synchronizing the modifications made to the one or more records with other records located in the relational database;
   reconciling the modifications made to the one or more records with other records located in the relational database;
   delivering, via the messaging framework, a notification to the at least one user assigned to the requested action;
   wherein the method further comprises a messaging framework comprising logic for achieving each of the steps of the method; and
   wherein the steps are performed using specifically configured computational machinery having instructions stored on a processor.

14. The method of claim 13 further comprising the step of synchronizing the modifications made to the one or more records with other records located in the relational database.

15. The method of claim 13 further comprising the step of reconciling the modifications made to the one or more records with other records located in the relational database.

16. The method of claim 13 further comprising the step of delivering, via the messaging framework, a notification to the at least one user assigned to the requested action.

17. The method of claim 13 further comprising the step of delivering, via the messaging framework, an alert to the user requesting the action when the at least one user assigned to the action receives the requested action, acts upon the requested action or fails to act upon the requested action within a specified time.

18. The method of claim 13, wherein the steps of tracking and reporting are repeated.

19. The method of claim 13, wherein each step is repeated for additional requested action.

20. The method of claim 13, wherein multiple actions are requested.

* * * * *